(12) United States Patent
Manther et al.

(10) Patent No.: US 9,574,466 B2
(45) Date of Patent: Feb. 21, 2017

(54) MULTI-POSITION CAMSHAFT PHASER WITH TWO ONE-WAY WEDGE CLUTCHES

(71) Applicant: Schaeffler Technologies AG & Co. KG, Herzogenaurach (DE)

(72) Inventors: Debora Manther, Royal Oak, MI (US); Jeffrey Shewell, Rochester, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/703,289

(22) Filed: May 4, 2015

(65) Prior Publication Data
US 2016/0326918 A1    Nov. 10, 2016

(51) Int. Cl.
*F01L 1/34* (2006.01)
*F01L 1/344* (2006.01)

(52) U.S. Cl.
CPC .. *F01L 1/34409* (2013.01); *F01L 2001/34423* (2013.01); *F01L 2001/34463* (2013.01)

(58) Field of Classification Search
CPC .................. F01L 1/34409; F01L 2001/34423; F01L 2001/34463
USPC ....................................................... 123/90.17
See application file for complete search history.

(56) References Cited

U.S. PATENT DOCUMENTS 6,481,401 B1 *  11/2002  Schafer ................ F01L 1/3442
                                                         123/90.12

OTHER PUBLICATIONS

U.S. Appl. No. 14/686,478, filed Apr. 14, 2015.

* cited by examiner

*Primary Examiner* — Zelalem Eshete
(74) *Attorney, Agent, or Firm* — Chester Paul Maliszewski

(57) ABSTRACT

A camshaft phaser, including: a stator arranged to receive torque; a rotor arranged to be non-rotatably connected to a camshaft; first and second wedge plates radially disposed between the rotor and the stator; and a displacement assembly arranged to for an advance mode, displace the first wedge plate in a first axial direction so that the rotor is rotatable with respect to the stator in a first circumferential direction. For a retard mode, the displacement assembly is arranged to displace the second wedge plate in a second axial direction, opposite first axial direction, so that the rotor is rotatable with respect to the stator in a second circumferential direction, opposite the first circumferential direction.

20 Claims, 13 Drawing Sheets

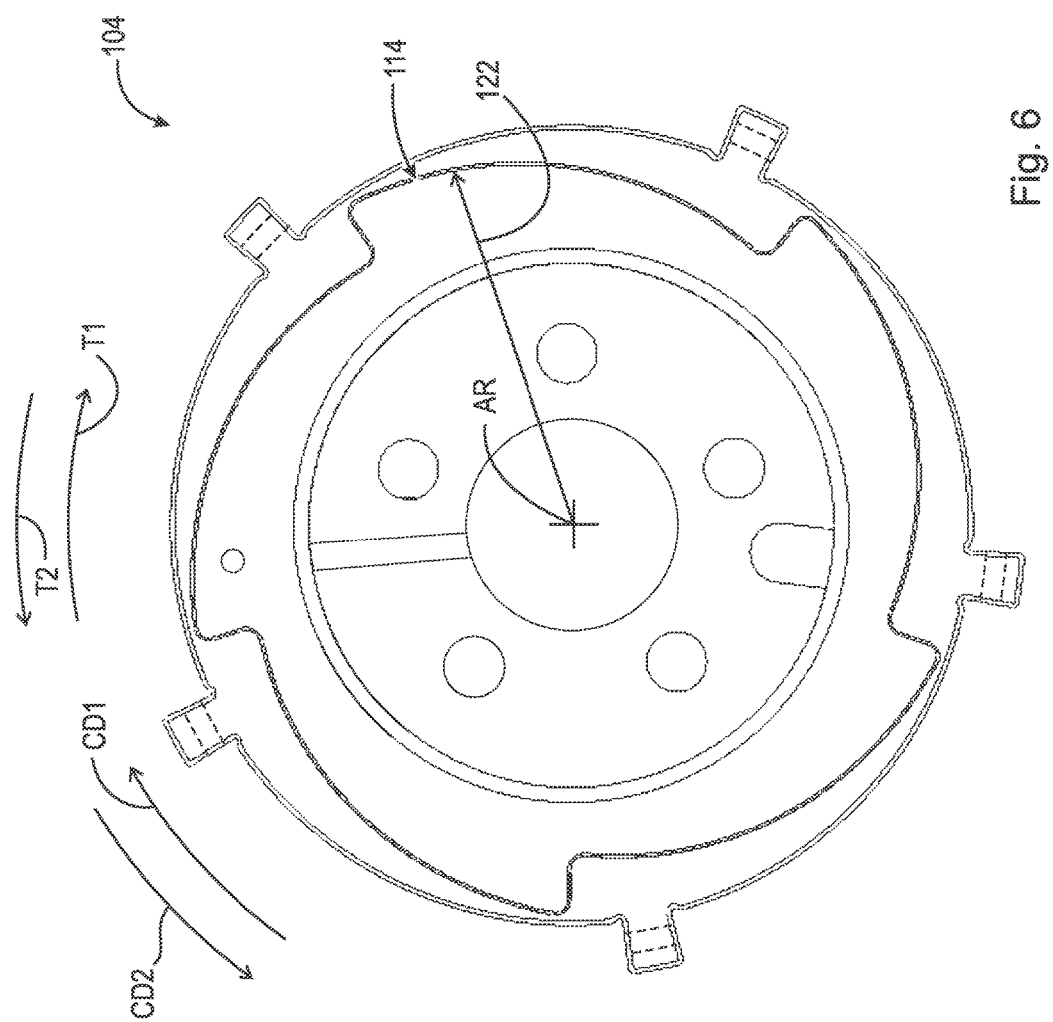

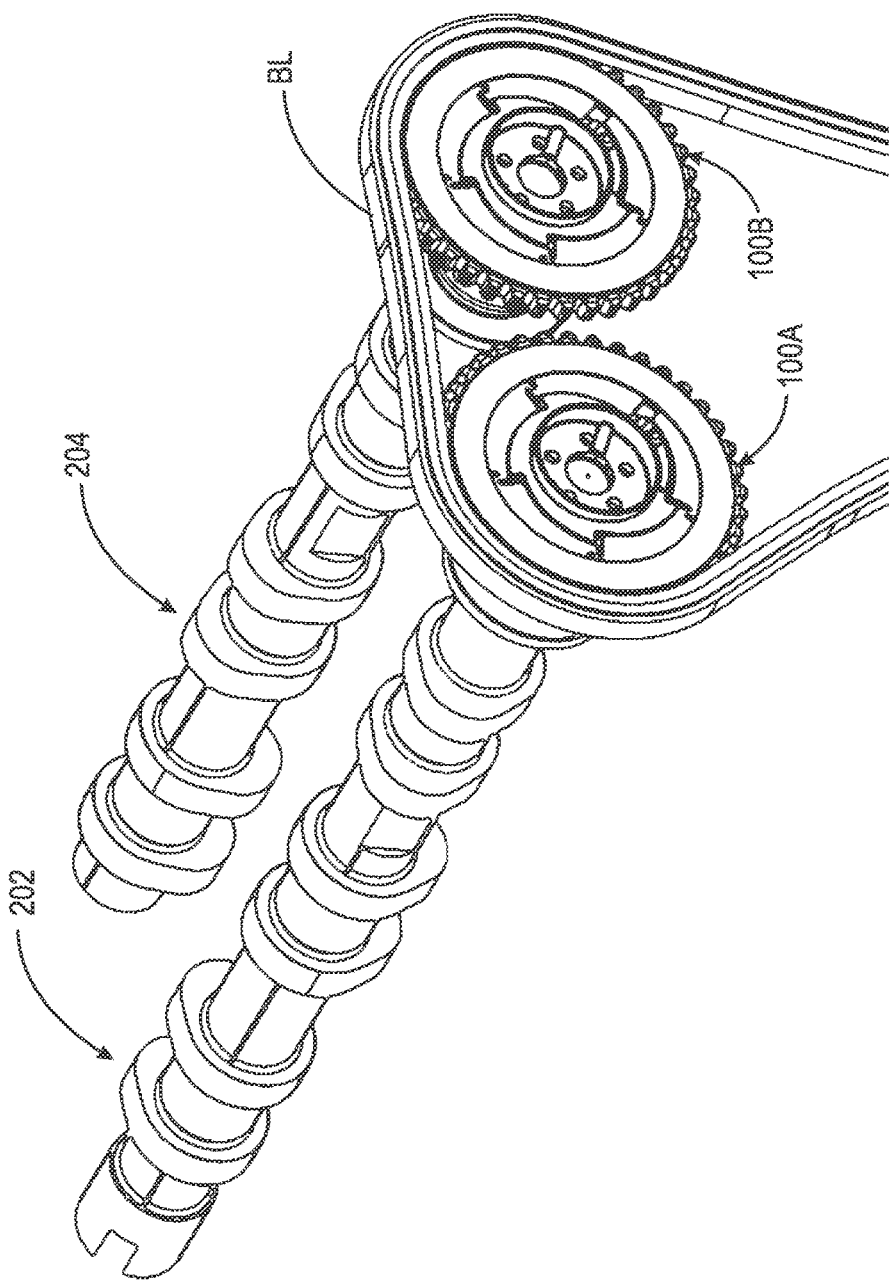

US 9,574,466 B2

MULTI-POSITION CAMSHAFT PHASER WITH TWO ONE-WAY WEDGE CLUTCHES

TECHNICAL FIELD

The present disclosure relates to a multi-position camshaft phaser with two one-way wedge clutches. In particular, the two one-way wedge clutches, with axially displaceable wedge plates, are used to advance and retard the phase of the rotor with respect to the stator.

BACKGROUND

It is known to use fluid pressure in chambers created by respective portions of a stator and a rotor for a camshaft phaser to maintain and shift a rotational position of the rotor with respect to the stator. This known technique involves complicated hydraulic systems and controls.

SUMMARY

According to aspects illustrated herein, there is provided a camshaft phaser, including: a stator arranged to receive torque from an engine; a rotor arranged to be non-rotatably connected to a camshaft; first and second wedge plates radially disposed between the rotor and the stator; and a displacement assembly arranged to: for an advance mode, displace the first wedge plate in a first axial direction so that the rotor is rotatable with respect to the stator in a first circumferential direction; and for a retard mode, displace the second wedge plate in a second axial direction, opposite first axial direction, so that the rotor is rotatable with respect to the stator in a second circumferential direction, opposite the first circumferential direction.

According to aspects illustrated herein, there is provided a camshaft assembly, including: a stator arranged to receive torque from an engine; a rotor arranged to be non-rotatably connected to a camshaft; first and second wedge plates radially disposed between the rotor and the stator; and a displacement assembly including first and second wedge rings aligned with the stator in a first axial direction. For an advance mode: the rotor is rotatable with respect to the stator in a first circumferential direction; the displacement assembly is arranged to displace the second wedge ring in the first axial direction; and the second wedge ring is arranged to displace the second wedge plate in the first axial direction to block rotation of the rotor, with respect to the stator, in a second circumferential direction, opposite the first circumferential direction. For a retard mode: the rotor is rotatable with respect to the stator in the second circumferential direction; the displacement assembly is arranged to displace the first wedge ring in the second axial direction; and the first wedge ring is arranged to displace the first wedge plate in the second axial direction to block rotation of the rotor, with respect to the stator, in the first circumferential direction.

According to aspects illustrated herein, there is provided a method of fabricating a camshaft, including: installing a rotor within a stator arranged to receive torque from an engine, the rotor arranged to be non-rotatably connected to a camshaft; installing first and second wedge plates radially between the rotor and the stator and axially sandwiching a radially outer portion of the rotor; installing a first wedge ring radially about the rotor and axially aligned with a radially outer portion of the first wedge plates; installing a second wedge ring radially about the rotor, axially aligned with a radially outer portion of the second wedge ring, and so that the first and second wedge rings axially sandwich the stator and the radially outer portions of the first and second wedge rings; and installing a displacement assembly including: a first solenoid arranged to urge the first wedge ring toward the stator, a second solenoid arranged to urge the second wedge ring toward the stator, and first and second resilient elements arranged to urge the first and second wedge rings, respectively, away from the stator; or, first and second hydraulic circuits in the rotor and the stator arranged to receive pressurized fluid to urge the first and second wedge rings, respectively, away from the stator.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 6 is a front view of the rotor in FIG. 3;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
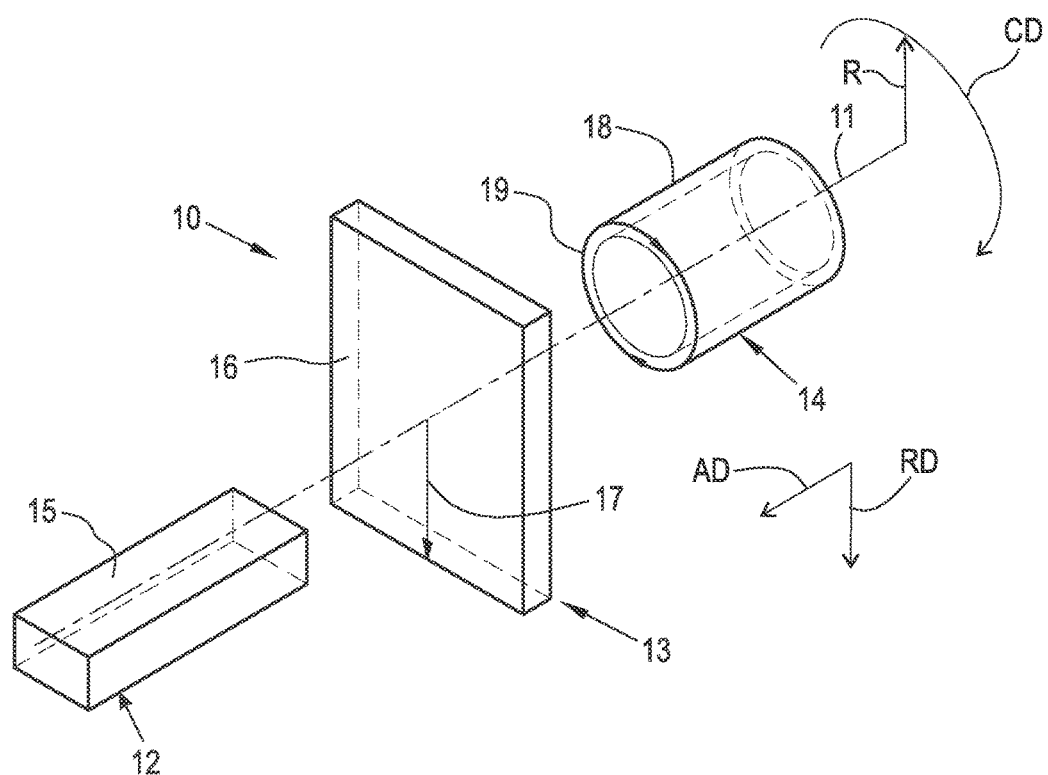
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
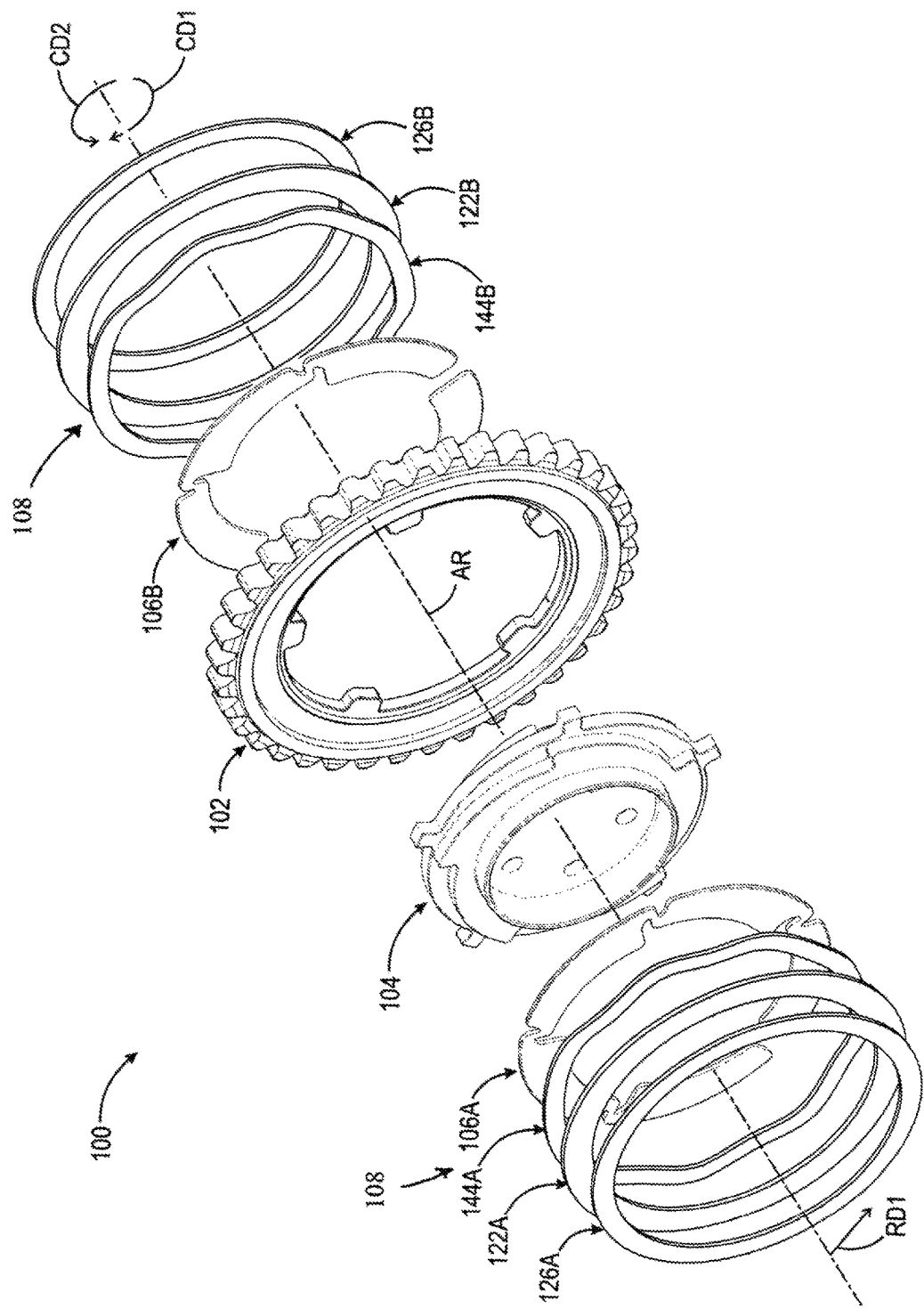
FIG. 2 is a perspective exploded view of a camshaft phaser with two-way wedge clutches and axially displaceable wedge plates.

FIG. 2 is a perspective exploded view of camshaft phaser 100 with two-way wedge clutches and radially displacing pins.

Figure 3:
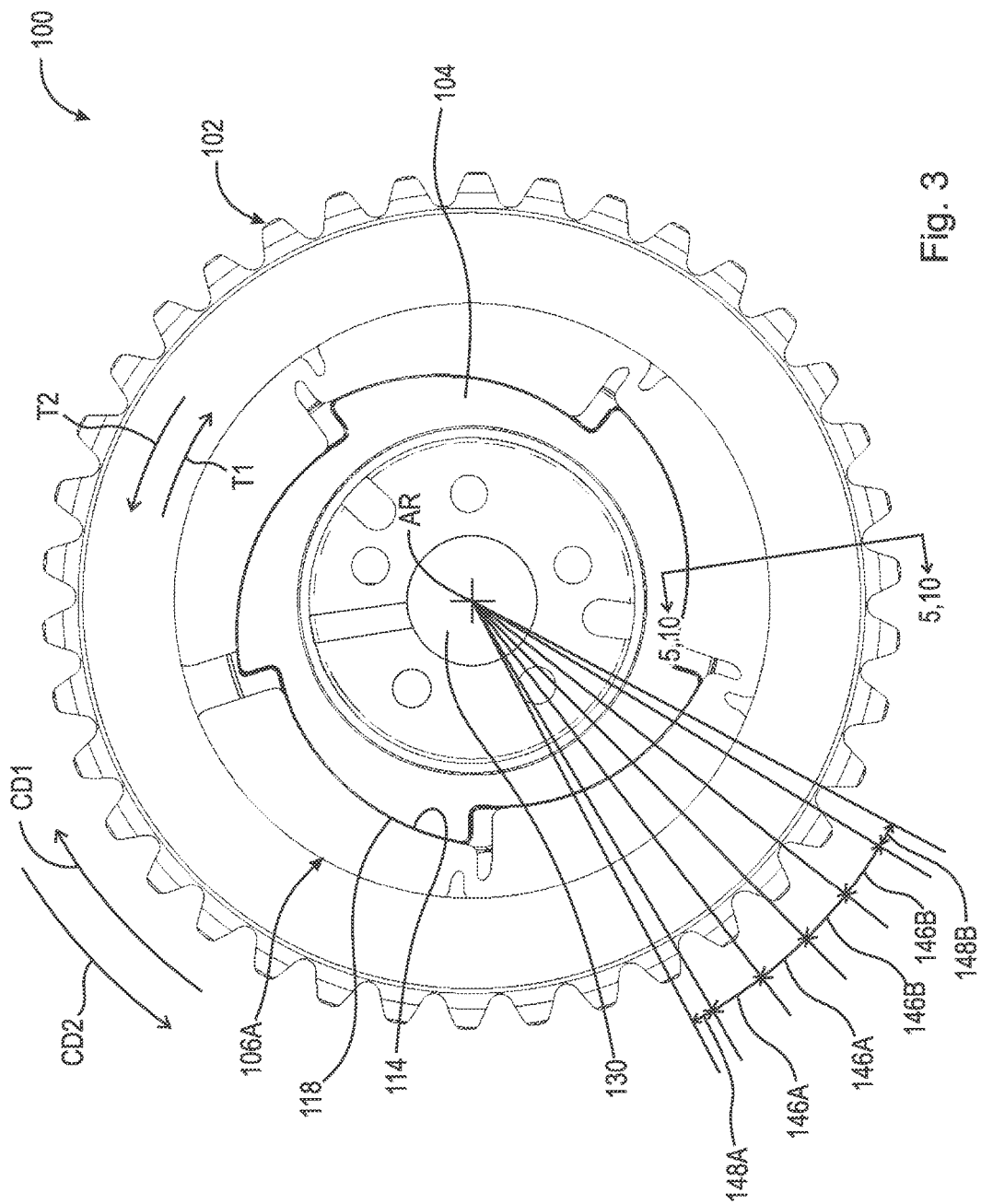
FIG. 3 is a front view of the camshaft phaser in FIG. 2 with the wedge ring removed.

FIG. 3 is a front view of camshaft phaser 100 in FIG. 2 with wedge rings removed.

Figure 4:
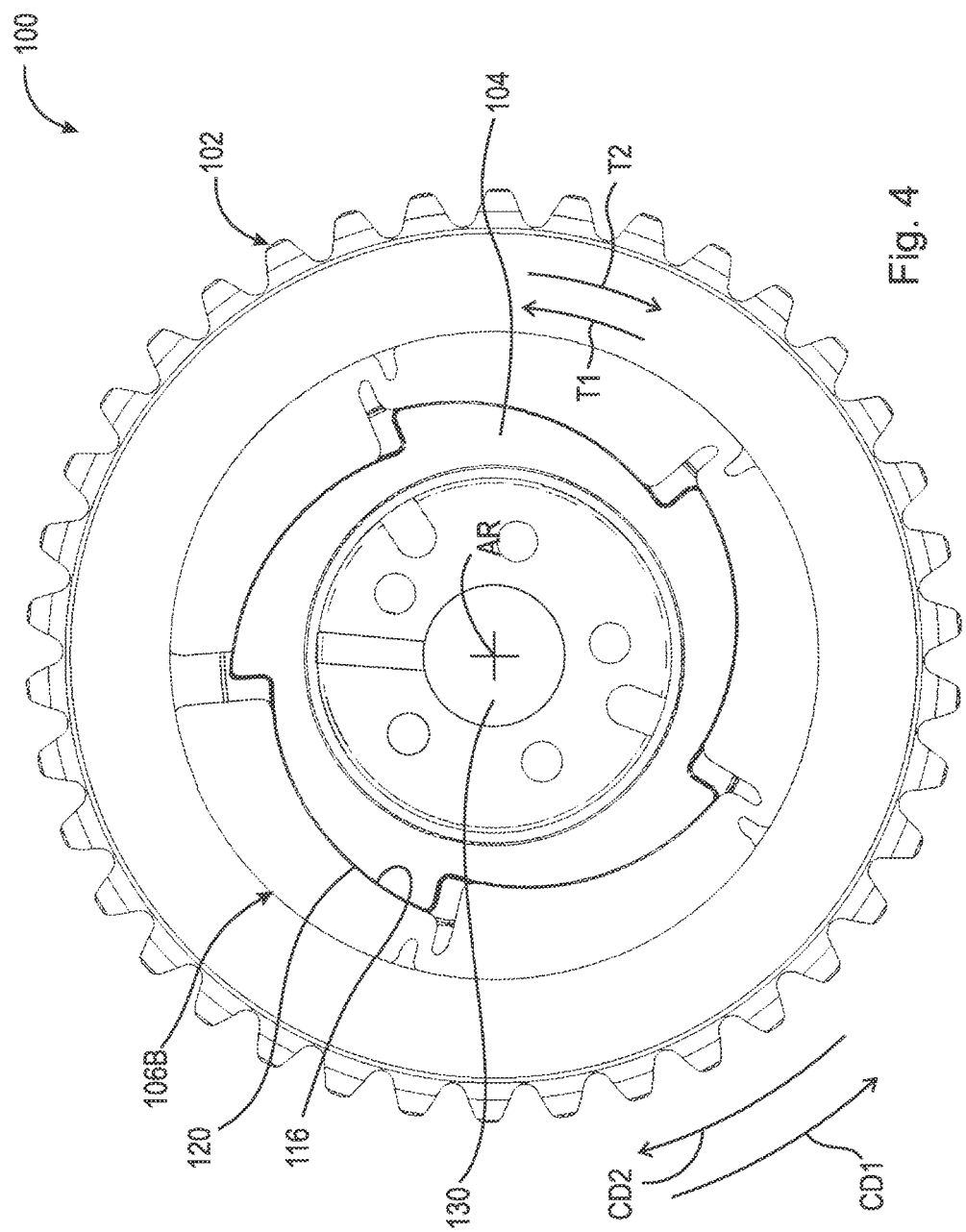
FIG. 4 is a rear view of the camshaft phaser in FIG. 2 with the wedge ring removed.

FIG. 4 is a rear view of camshaft phaser 100 in FIG. 2 with wedge rings removed.

Figure 5A:
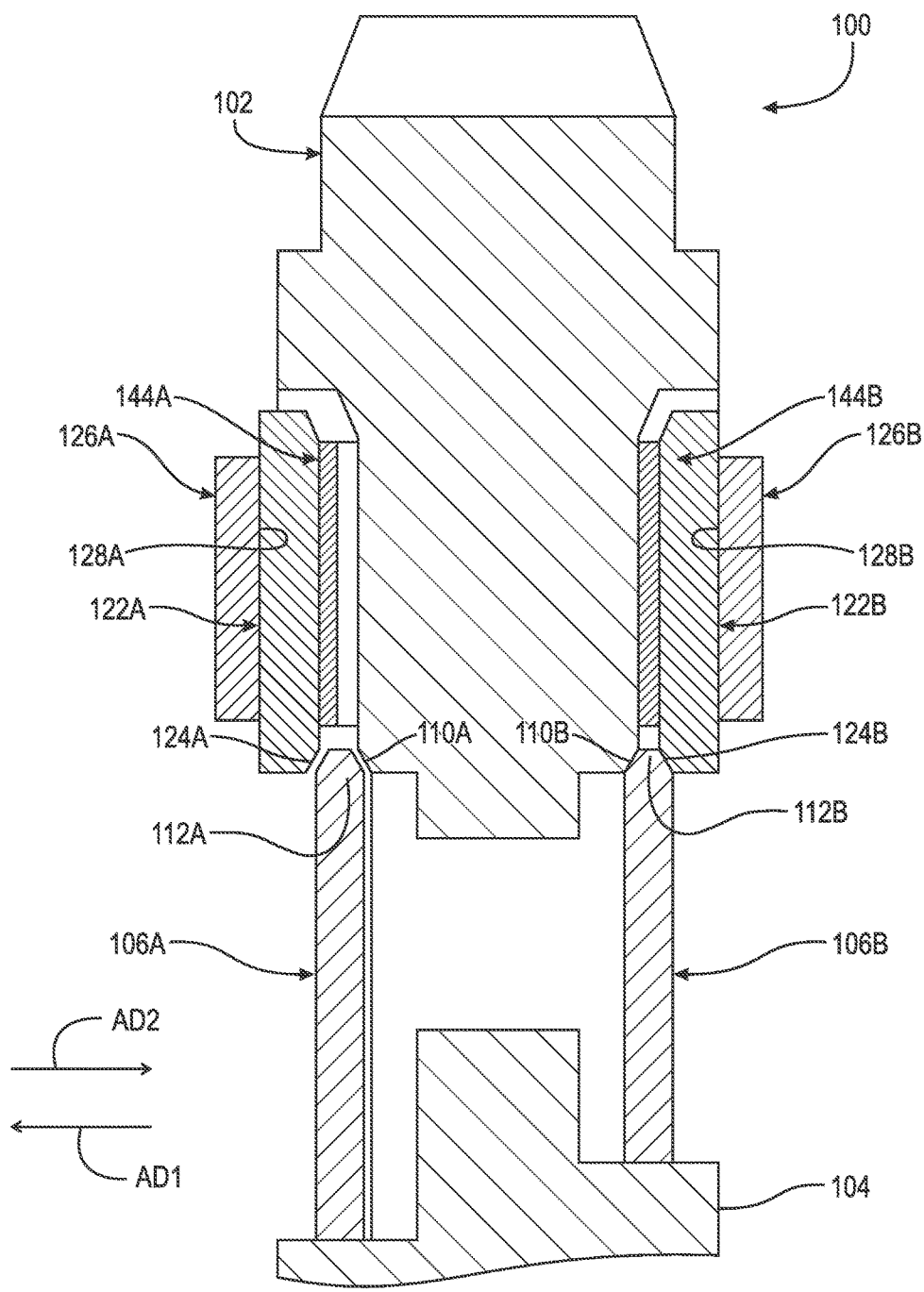
FIG. 5A is a cross-sectional view generally along line 5-5 in FIG. 3, with the wedge rings added, showing an advance mode.

FIG. 5A is a cross-sectional view generally along line 5-5 in FIG. 3, with wedge rings added, showing an advance mode.

Figure 5B:
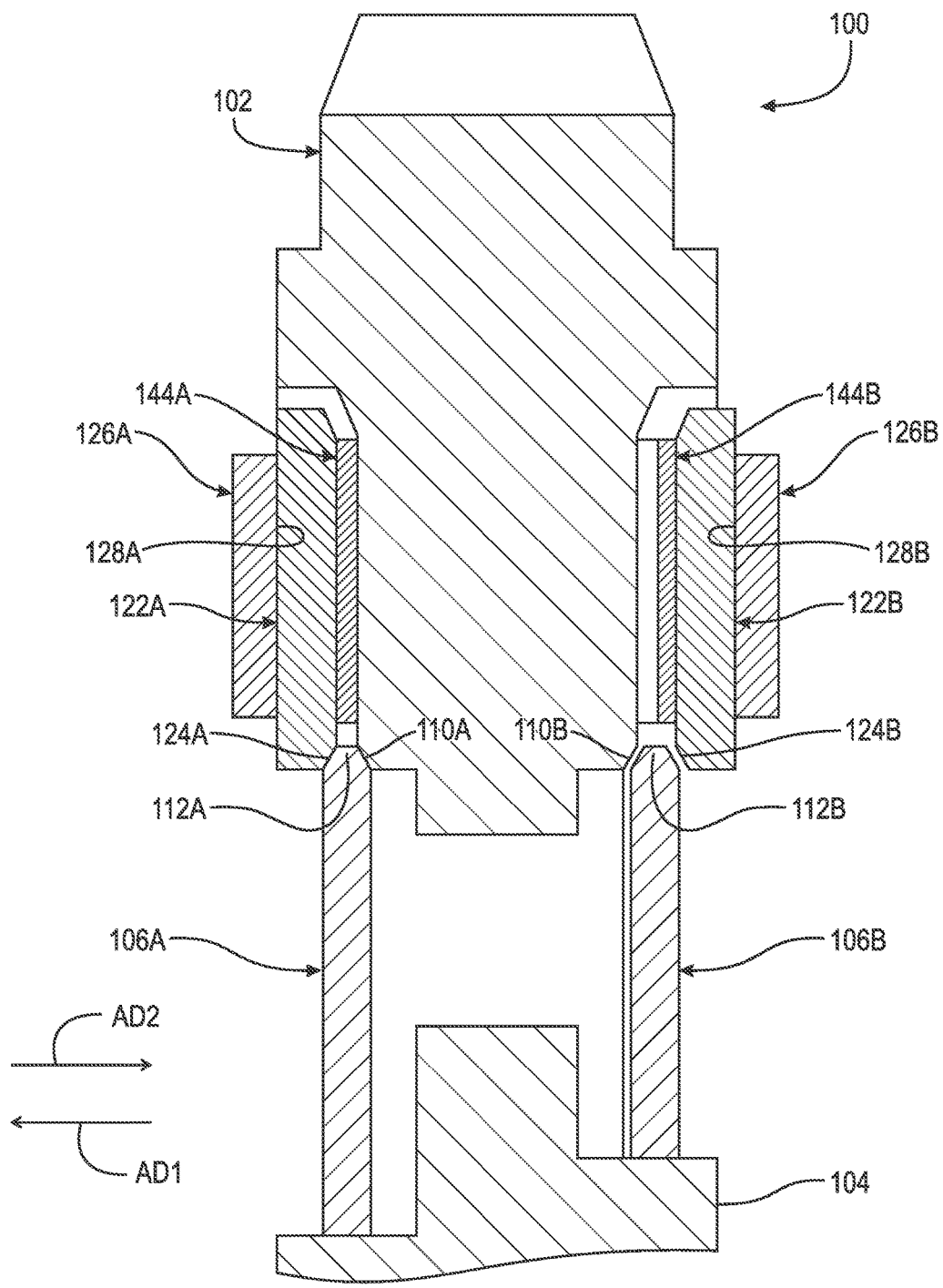
FIG. 5B is a cross-sectional view generally along line 5-5 in FIG. 3, with the wedge rings added, showing a retard mode.

FIG. 5B is a cross-sectional view generally along line 5-5 in FIG. 3, with wedge rings added, showing a retard mode. The following should be viewed in light of FIGS. 2 through 5B. Camshaft phaser 100 includes stator 102, rotor 104, wedge plates 106A and 106B, and displacement assembly 108. Stator 102 is arranged to receive torque from an engine (not shown). Rotor 104 is arranged to be non-rotatably connected to a camshaft (not shown). Wedge plates 106A and 106B are radially disposed between rotor 104 and stator 102.

For an advance mode, displacement assembly 108 is arranged to displace wedge plate 106A in axial direction AD1 so that rotor 104 is rotatable with respect to stator 102 in circumferential direction CD1. For a retard mode, displacement assembly 108 is arranged to displace wedge plate 106B in axial direction AD2, opposite direction AD1, so that rotor 104 is rotatable with respect to stator 102 in circumferential direction CD2, opposite direction CD1.

For the advance mode, displacement assembly 108 is arranged to displace wedge plate 106B in axial direction AD1 to block rotation of rotor 104, with respect to stator 102, in the circumferential direction CD2. For the retard mode, displacement assembly 108 is arranged to displace wedge plate 106A in axial direction AD2 to block rotation of rotor 104, with respect to stator 102, in the circumferential direction CD1.

To block rotation of rotor 104, with respect to stator 102, in circumferential direction CD2, displacement assembly 108 is arranged to non-rotatably connect rotor 104, wedge plate 106B, and stator 102. To block rotation of rotor 104, with respect to stator 102, in circumferential direction CD1, displacement assembly 108 is arranged to non-rotatably connect rotor 104, wedge plate 106A, and stator 102.

In an example embodiment: stator 102 includes chamfered surface 110A and chamfered surface 110B; wedge plate 106A and wedge plate 106B include chamfered radially outer portions 112A and 112B, respectively; for the advance mode, displacement assembly 108 is arranged to displace wedge plate 106B to frictionally engage chamfered radially outer portion 112B and chamfered surface 110B; and for the retard mode, displacement assembly 108 is arranged to displace wedge plate 106A to frictionally engage chamfered radially outer portion 112A and chamfered surface 110A.

Figure 7:
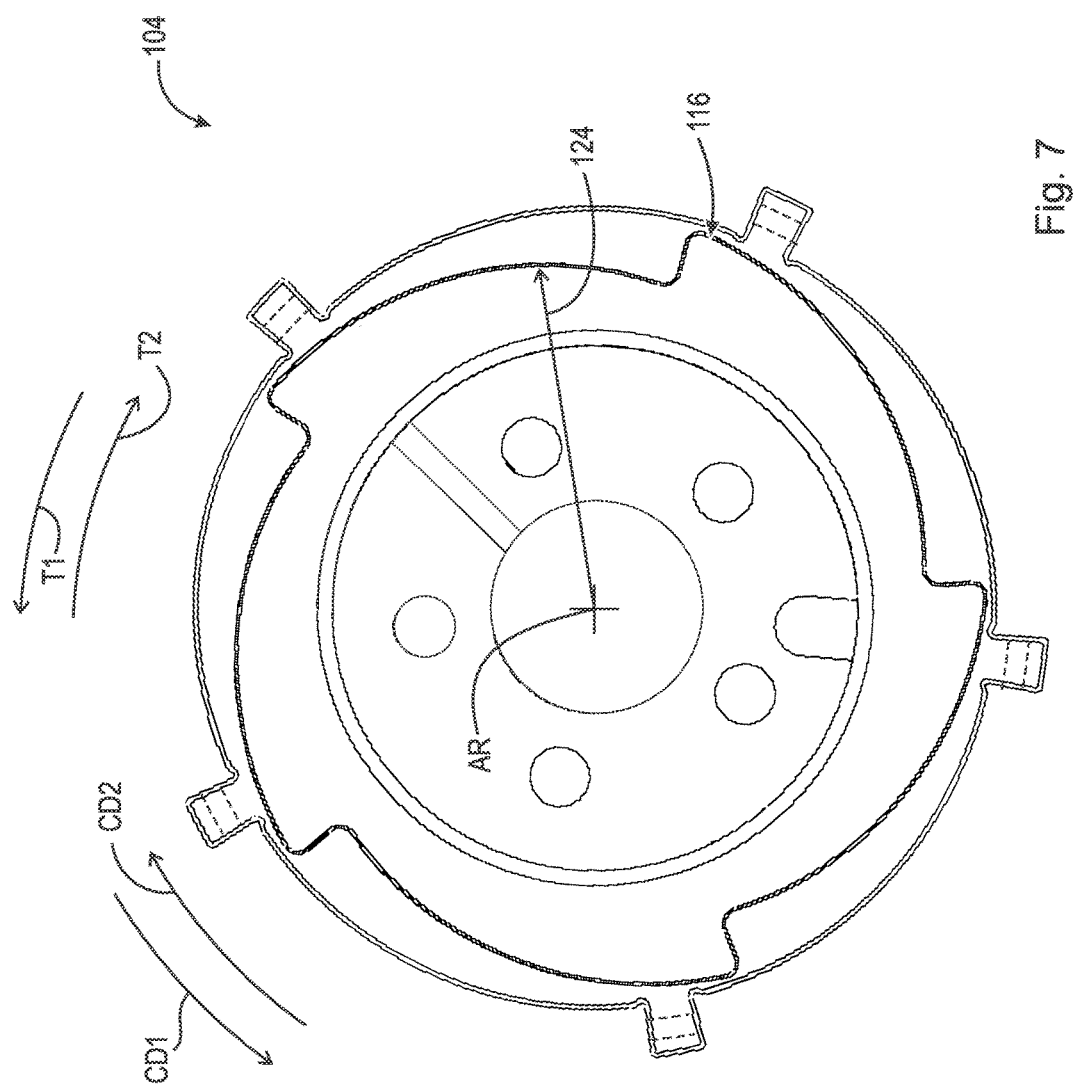
FIG. 7 is a rear view of the rotor in FIG. 4.
Figure 8:
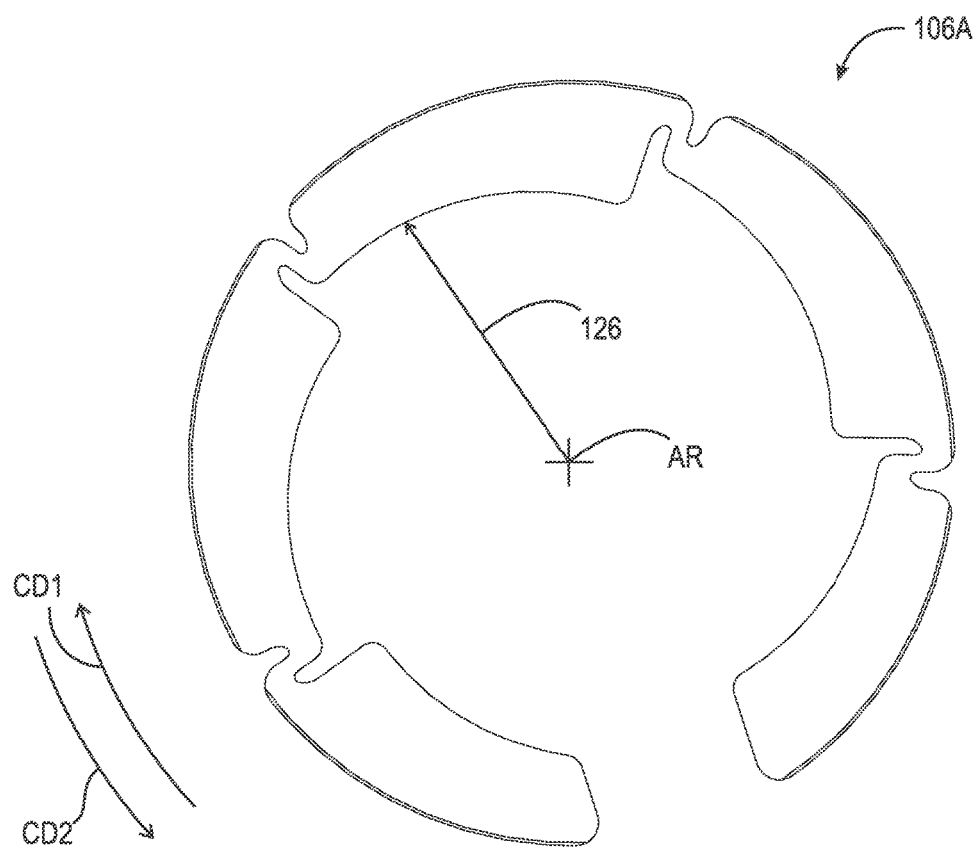
FIG. 8 is a front view of the wedge plate in FIG. 3.
Figure 9:
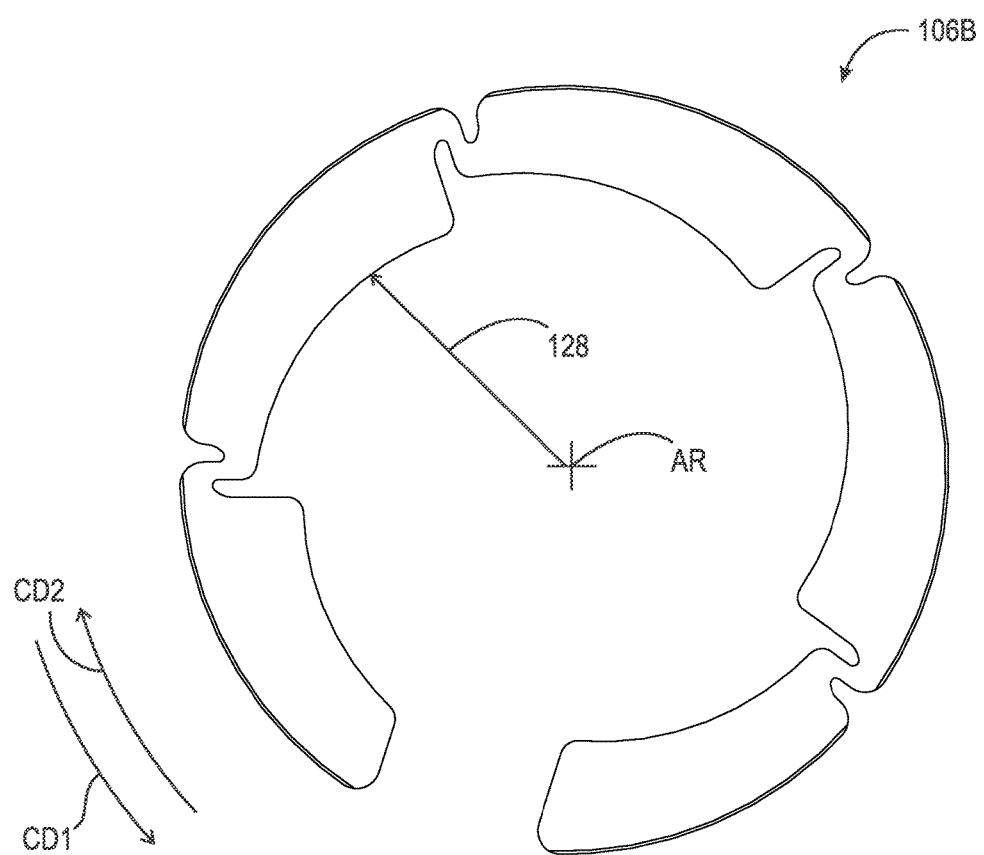
FIG. 9 is a rear view of the wedge plate in FIG. 4.

FIG. 6 is a front view of rotor 104 in FIG. 3.
FIG. 7 is a rear view of rotor 104 in FIG. 4.
FIG. 8 is a front view of wedge plate 106A in FIG. 3
FIG. 9 is a rear view of wedge plate 106B in FIG. 4. The following should be viewed in light of FIGS. 2 through 9. Rotor 104 includes ramps 114 and 116, respectively. Wedge plates 106A and 106B include ramps 118 and 120, respectively, engaged with ramps, 114 and 116, respectively. Radial distance 122 for ramps 114 increases in direction CD2. Radial distance 124 for ramps 116 increases in distance CD1. Radial distance 126 for ramps 118 increases in direction CD2. Radial distance 128 for ramps 120 increases in direction CD1. For the advance mode: ramps 114 are arranged to slide along ramps 118 in circumferential direction CD1; and ramps 116 are arranged to slide along ramps 120 in circumferential direction CD2 to non-rotatably connect rotor 104, wedge plate 106B, and stator 102. For the retard mode: ramps 116 are arranged to slide along ramps 120 in circumferential direction CD2; and ramps 114 are arranged to slide along ramps 118 in circumferential direction CD1 to non-rotatably connect rotor 104, wedge plate 106A, and stator 102.

Displacement assembly 108 includes wedge rings 122A and 122B aligned with respective portions of wedge plates 106A and 106B in axial direction AD1. For the advance mode: displacement assembly 108 is arranged to displace wedge ring 122B in axial direction AD1; and wedge ring 122B is arranged to displace wedge plate 106B in axial direction AD1. For the retard mode: displacement assembly 108 is arranged to displace wedge ring 122A in axial direction AD2; and wedge ring 122A is arranged to displace wedge plate 106A in axial direction AD2.

In an example embodiment, wedge rings 122A and 122B include chamfered surfaces, 124A and 124B, respectively. For the advance mode, displacement assembly 108 is arranged to displace wedge ring 122B in direction AD1 to frictionally engage portion 112B with the chamfered surfaces 110B and 124B. For the retard mode, displacement assembly 108 is arranged to displace wedge ring 122A in direction AD2 to frictionally engage portion 112A with the chamfered surfaces 110A and 125A.

In an example embodiment, displacement assembly 108 includes solenoids 126A and 126B, for example, respective pancake solenoids. For the retard mode, solenoid 126A is arranged to engage side 128A of wedge ring 122A to displace wedge ring 122A in axial direction AD2 to non-rotatably connect rotor 104, wedge plate 106A, and stator 102. For the advance mode, solenoid 126B is arranged to engage side 128B of wedge ring 122B to displace wedge ring 122B in axial direction AD1 to non-rotatably connect rotor 104, wedge plate 106B, and stator 102.

In an example embodiment, displacement assembly 108 includes resilient elements 144A and 144B. Element 142A is axially disposed between wedge ring 122A and stator 102. For the advance mode, element 144A is arranged to displace wedge ring 122A in direction AD1 to enable rotation of rotor 104 with respect to stator 102. Element 144B is axially disposed between wedge ring 122B and stator 102. For the retard mode, element 144B is arranged to displace wedge ring 122B in direction AD2 to enable rotation of rotor 104 with respect to stator 102. Elements 144A and 144B can be any resilient elements known in the art, for example wave washers or Bellevue springs.

Figure 10A:
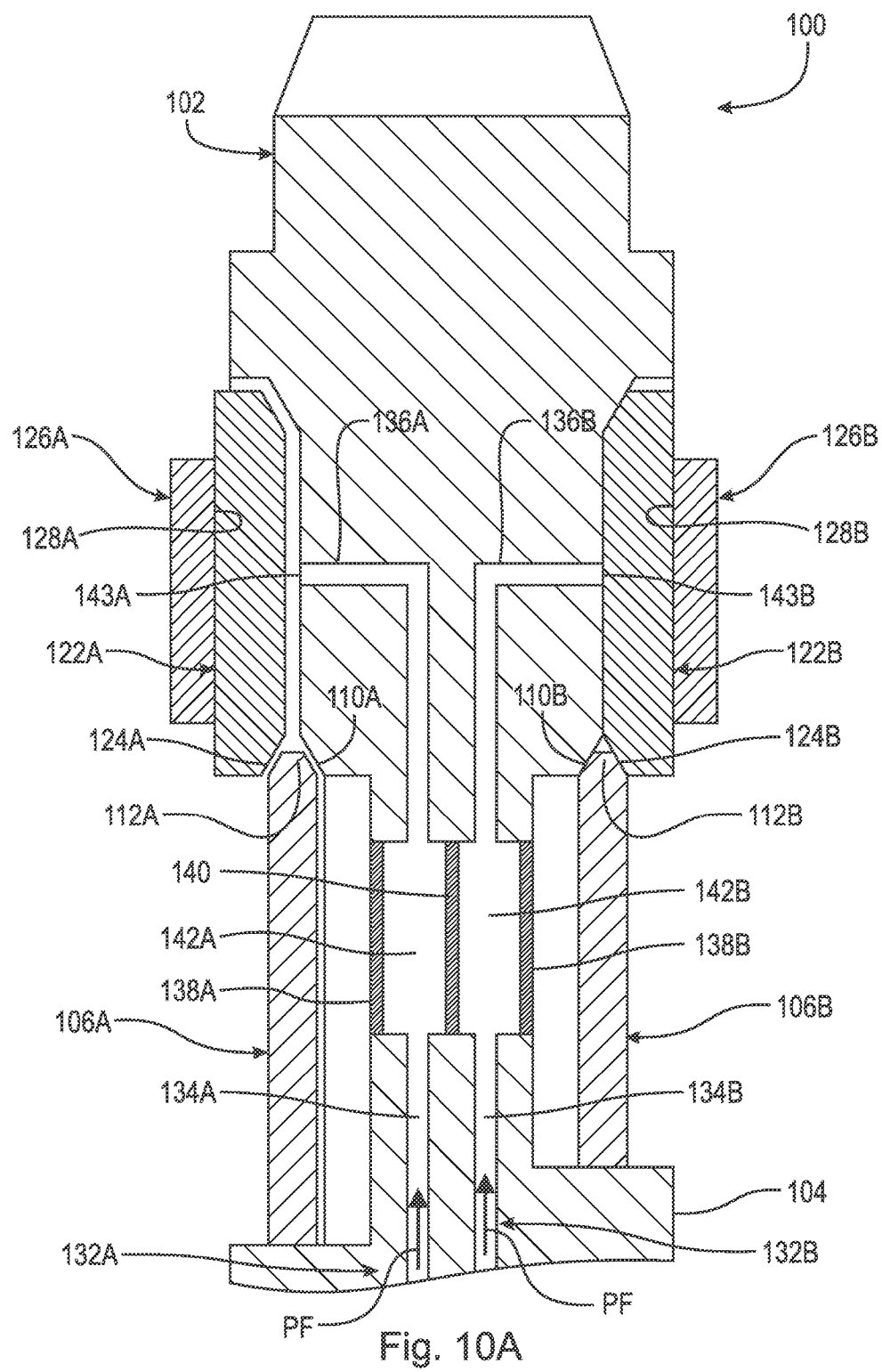
FIG. 10A is a cross-sectional view generally along line 10-10 in FIG. 3, with the wedge rings added and hydraulic circuits replacing the resilient elements, showing the advance mode.

FIG. 10A is a cross-sectional view generally along line 10-10 in FIG. 3, with the wedge rings added and hydraulic circuits in place of resilient elements, showing the advance mode.

Figure 10B:
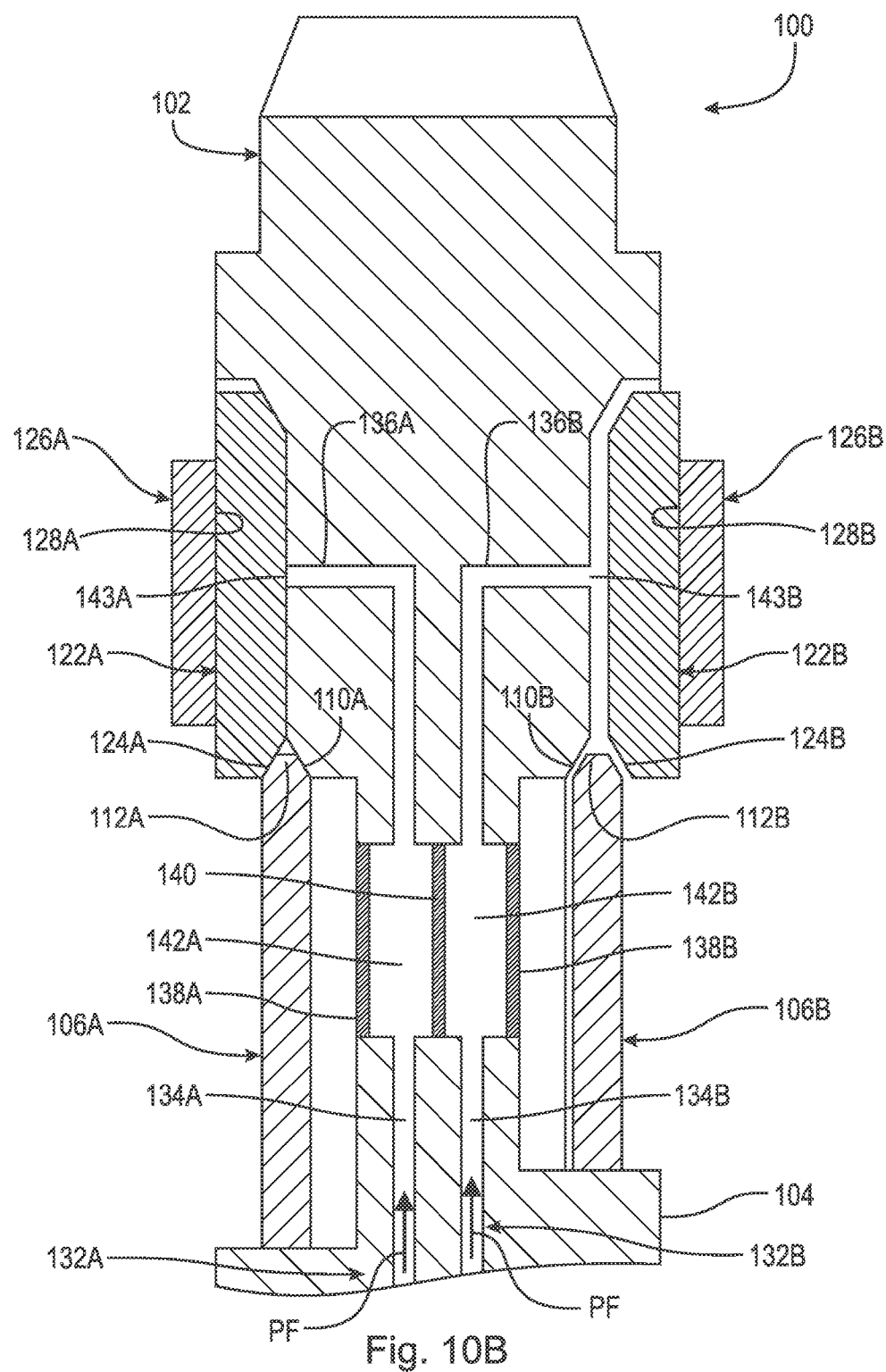
FIG. 10B is a cross-sectional view generally along line 10-10 in FIG. 3, with the wedge rings added and hydraulic circuits replacing the resilient elements, showing the retard mode; and, FIG. 11 is a perspective view of camshaft phasers connected to respective cam shafts.

FIG. 10B is a cross-sectional view generally along line 10-10 in FIG. 3, with the wedge rings added and solenoids and hydraulic circuits in place of resilient elements, showing the retard mode. Rotor 104 includes central opening 130 through which axis of rotation AR for the camshaft phaser passes. In an example embodiment, displacement assembly 108 includes fluid circuits 132A and 132B. Circuit 132A includes channel 134A in rotor 104 and channel 136A in stator 102. Circuit 132B includes channel 134B in rotor 104 and channel 136B in stator 102. Side walls 138A and 138B and dividing wall 140 form chambers 142A and 142B. Walls 138A, 138B, and 140 form seals with respect to rotor 104 and stator 102. Walls 138A, 138B, and 140 can be non-rotatably connected to rotor 104 or stator 102.

For the advance mode, pressurized fluid PF in circuit 132A is arranged to flow from opening 130 to opening 143A in channel 136A, via channel 134A and chamber 142A, to displace wedge ring 122A in direction AD1 to enable rotation of rotor 104 with respect to stator 102. For the retard mode, pressurized fluid PF in circuit 132B is arranged to flow from opening 130 to opening 143B in channel 136B, via channel 134B and chamber 142B, to displace wedge ring 122B in direction AD2 to enable rotation of rotor 104 with respect to stator 102.

In an example embodiment (not shown): solenoids 126A and 126B are arranged to pull wedge rings 122A and 122B in directions AD1 and AD2, respectively; and resilient elements 142A and 142B are arranged to pull wedge rings 122A and 122B in directions AD2 and AD1, respectively.

In an example embodiment (not shown): resilient elements 144A and 144B are arranged to push wedge rings 122A and 122B in directions AD2 and AD1, respectively; and fluid circuits 132A and 132B are arranged to push wedge rings 122A and 122B in directions AD1 and AD2, respectively. For example, element 144A is axially located between wedge ring 122A and a side plate (not shown) located beyond ring 122A in direction AD1. For example, element 144B is axially located between wedge ring 122B and a side plate (not shown) located beyond ring 122B in direction AD2.

FIG. 11 is a perspective view of camshaft phasers 100A and 100B connected to cam shafts 202 and 204, respectively. The discussion regarding phaser 100 is applicable to phasers 100A and 100B. Typically, one of cam shafts 202 and 204 is for an intake valve train and the other of cam shafts 202 and 204 is for an exhaust valve train. Phasers 100A and 100B are rotated by chain (simplified chain model—chain sprockets are shown) BL, typically driven by a crankshaft for an engine of which the camshafts and phasers are a part. The following discussion is directed to phaser 100A; however, it should be understood that the discussion is applicable to phaser 100B as well.

In the discussion that follows, stator 102 rotates in direction CD1 in response to torque from chain BL. As is known in the art, torsional forces T1 and T2 are transmitted from camshaft 202, in directions CD1 and CD2, respectively, to rotor 104 during operation of phaser 100. The torsional force forces are due to interaction of cam lobes (not shown) on camshaft 202 with various components of a valve train (not shown) of which camshaft 202 is a part. Torsional forces T1 and T2 are transmitted in a repeating cycle. Rotor 104 rotates in direction CD1; however, torsional force T1 urges rotor 104 in direction CD1 with respect to the stator and torsional force T2 urges rotor 104 in direction CD2 with respect to the stator.

For a drive mode, the relative circumferential position of rotor 104 with respect to stator 102 is substantially fixed. For the drive mode, displacement assembly 108 displaces wedge rings 122A and 122B in axial directions AD2 and AD1, respectively. The drive mode can be viewed as having two phases. For the first phase, force T1 is received by rotor 104 and wedge plate 106A non-rotatably connects the rotor and the stator to prevent rotation of the rotor, with respect to the stator in direction CD1. For the second phase, force T2 is received by rotor 104 and wedge plate 106B non-rotatably connects the rotor and the stator to prevent rotation of the rotor, with respect to the stator in direction CD2.

The following describes the advance mode. Assume stator 102 is rotating in direction CD1 and phaser 100A receives torsional force T1. Displacement assembly 108: displaces wedge ring 122A in axial direction AD1 to enable rotation of rotor 104 with respect to wedge plate 106A and stator 102; and displaces wedge ring 122B in axial direction AD2 to enable rotation of rotor 104 with respect to wedge plate 106B and stator 102. Thus, ramps 114 slide along ramps 118 and rotor 104 displaces distance 146A in direction CD1, while ramps 116 slide along ramps 120.

The rotor then receives torque T2. Displacement assembly 108: displaces wedge ring 122B in axial direction AD1 to non-rotatably connect rotor 104, wedge plate 106B, and stator 102; and displaces wedge ring 122A in axial direction AD1 so rotor 104 is rotatable with respect to wedge plate 106A and the stator. Thus, ramps 116 slide along ramps 120. As a result, as soon as the rotor receives torque T2, rotor 104 is prevented from rotating back in direction CD2, which would cancel the displacement in distance 146A. Ramps 114 slide along ramps 118 enough to enable the sliding of ramps 116 along ramps 120. Therefore, in the advance mode, for each cycle of torques T1 and T2, rotor 104 rotates distance 146A in direction CD1. For successive cycles of T1 and T2 in the advance mode, rotor 104 displaces distance 146A, with respect to stator 102, in direction CD1. That is, this process is repeatable via successive cycles of torsional forces T1 and T2 to attain a desired shift of rotor 104.

The following describes the retard mode. Assume stator 102 is rotating in direction CD1 and phaser 100A receives torsional force T2. Displacement assembly 108: displaces wedge ring 122B in axial direction AD2 to enable rotation of rotor 104 with respect to wedge plate 106B and stator 102; and displaces wedge ring 122A in axial direction AD1 to enable rotation of rotor 104 with respect to wedge plate 106B and stator 102. Thus, ramps 116 slide along ramps 120 and rotor 104 displaces distance 146B in direction CD2, while ramps 114 slide along ramps 118.

The rotor then receives torque T1. Displacement assembly 108: displaces wedge ring 122A in axial direction AD2 to non-rotatably connect rotor 104, wedge plate 106A, and stator 102; and displaces wedge ring 122B in axial direction AD2 so rotor 104 is rotatable with respect to wedge plate 106B and the stator. Thus, ramps 114 slide along ramps 118. As a result, as soon as the rotor receives torque T1, rotor 104 is prevented from rotating back in direction CD1, which would cancel the displacement in distance 146B. Ramps 116 slide along ramps 120 enough to enable the sliding of ramps 114 along ramps 118. Therefore, in the retard mode, for each cycle of torques T1 and T2, rotor 104 rotates distance 146B in direction CD2. For successive cycles of T1 and T2 in the retard mode, rotor 104 displaces distance 146B, with respect to stator 102, in direction CD2. That is, this process is repeatable via successive cycles of torsional forces T1 and T2 to attain a desired shift of rotor 104.

Each distance 146A is a result of phaser 100A implementing a full cycle of torsional force forces T1 and T2. To shift rotor 104 in direction CD1 by distance 148A, less than distance 144A,
when torque T1 is received, displacement assembly 108: displaces wedge ring 122A in axial direction AD1 to enable rotation of rotor 104 with respect to wedge plate 106A and stator 102; and displaces wedge ring 122B in axial direction AD2 to enable rotation of rotor 104 with respect to wedge plate 106B and stator 102. However, after rotor 104 has begun rotation in direction CD1 (by distance 148A) but before rotor 104 has rotated distance 146A, displacement assembly 108 displaces wedge ring 122A in axial direction AD2 to non-rotatably connect rotor 104, wedge plate 106A, and stator 102 and prevent further rotation of rotor 104, with respect to stator 102, in direction CD1.

Each distance 146B is a result of phaser 100A implementing a full cycle of torsional force forces T1 and T2. To shift rotor 104 in direction CD2 by distance 148B, less than distance 146B,
when torque T2 is received, displacement assembly 108: displaces wedge ring 122B in axial direction AD2 to enable rotation of rotor 104 with respect to wedge plate 106B and stator 102; and displaces wedge ring 122A in axial direction AD1 to enable rotation of rotor 104 with respect to wedge plate 106A and stator 102. However, after rotor 104 has begun rotation in direction CD2 (by distance 148B) but before rotor 104 has rotated distance 146B, displacement assembly 108 displaces wedge ring 122B in axial direction AD1 to non-rotatably connect rotor 104, wedge plate 106B, and stator 102 and prevent further rotation of rotor 104, with respect to stator 102, in direction CD2.

Camshaft phaser 100 operates at all times in one of the drive, advance or retard modes. That is, wedge rings 122A and 122B are not simultaneously displaced in directions AD1 and AD2, respectively.

Thus, rotor 104 can be controllably and repeatably rotated virtually any amount with respect to stator 102 in the advance and retard modes.

The following should be viewed in light of FIGS. 2 through 11. The following describes a method for fabricating a camshaft phaser. Although the method is presented as a sequence of steps for clarity, no order should be inferred from the sequence unless explicitly stated. A first step installs a rotor within a stator arranged to receive torque from an engine, the rotor arranged to be non-rotatably connected to a camshaft. A second step installs first and second wedge plates radially between the rotor and the stator and axially sandwiching a radially outer portion of the rotor. A third step installs a first wedge ring radially about the rotor and axially aligned with a radially outer portion of the first wedge ring. A fourth step installs a second wedge ring radially about the rotor, axially aligned with a radially outer portion of the second wedge ring, and so that the first and second wedge rings axially sandwich the stator and the radially outer portions of the first and second wedge plates. A fifth installs, for a displacement assembly: a first solenoid arranged to urge the first wedge ring toward the stator and a second solenoid arranged to urge the second wedge ring toward the stator. A sixth step installs for the displacement assembly first and second resilient elements arranged to urge the first and second wedge rings, respectively, away from the stator, or first and second hydraulic circuits in the rotor and the stator arranged to receive pressurized fluid to urge the first and second wedge rings, respectively, away from the stator.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A camshaft phaser, comprising:
    a stator arranged to receive torque from an engine;
    a rotor arranged to be non-rotatably connected to a camshaft;
    first and second wedge plates radially disposed between the rotor and the stator; and,
    a displacement assembly arranged to:
        for an advance mode, displace the first wedge plate in a first axial direction so that the rotor is rotatable with respect to the stator in a first circumferential direction; and,
        for a retard mode, displace the second wedge plate in a second axial direction, opposite the first axial direction, so that the rotor is rotatable with respect to the stator in a second circumferential direction, opposite the first circumferential direction.

2. The camshaft phaser of claim 1, wherein:
    for the advance mode, the displacement assembly is arranged to displace the second wedge plate in the first axial direction to block rotation of the rotor, with respect to the stator, in the second circumferential direction; and,
    for the retard mode, the displacement assembly is arranged to displace the first wedge plate in the second axial direction to block rotation of the rotor, with respect to the stator, in the first circumferential direction.

3. The camshaft phaser of claim 1, wherein:
the stator includes first and second chamfered surfaces;
the first and second wedge plates include first and second chamfered radially outer portions, respectively;
for the advance mode, the displacement assembly is arranged to frictionally engage the second chamfered radially outer portion with the second chamfered surface; and,
for the retard mode, the displacement assembly is arranged to frictionally engage the first chamfered radially outer portion with the first chamfered surface.

4. The camshaft phaser of claim 3, wherein:
the rotor includes first and second pluralities of ramps;
the first and second wedge plates include third and fourth pluralities of ramps engaged with the third and fourth pluralities of ramps, respectively;
for the advance mode:
the first plurality of ramps is arranged to slide along the third plurality of ramps in the first circumferential direction; and,
the second plurality of ramps is arranged to slide along the fourth plurality of ramps in the second circumferential direction to non-rotatably connect the rotor, the second wedge plate, and the stator; and,
for the retard mode:
the second plurality of ramps is arranged to slide along the fourth plurality of ramps in the second circumferential direction; and,
the first plurality of ramps is arranged to slide along the third plurality of ramps in the first circumferential direction to non-rotatably connect the rotor, the first wedge plate, and the stator.

5. The camshaft phaser of claim 1, wherein:
the displacement assembly includes first and second wedge rings aligned with respective portions of the first and second wedge plates in the first axial direction;
for the advance mode:
the displacement assembly is arranged to displace the second wedge ring in the first axial direction; and,
the second wedge ring is arranged to displace the second wedge plate in the first axial direction; and,
for the retard mode:
the displacement assembly is arranged to displace the first wedge ring in the second axial direction; and,
the first wedge ring is arranged to displace the first wedge plate in the second axial direction.

6. The camshaft phaser of claim 5, wherein
the stator includes first and second chamfered surfaces;
the first and second wedge plates include first and second chamfered radially outer portions, respectively;
the first and second wedge rings include third and fourth chamfered surfaces, respectively;
for the advance mode, the displacement assembly is arranged to frictionally engage the second chamfered radially outer portion with the second and fourth chamfered surfaces; and,
for the retard mode, the displacement assembly is arranged to frictionally engage the first chamfered radially outer portion with the first and third chamfered surfaces.

7. The camshaft phaser of claim 5, wherein the displacement assembly includes:
a first solenoid arranged to displace the first wedge ring in the second axial direction; and,
a second solenoid arranged to displace the second wedge ring in the first axial direction.

8. The camshaft phaser of claim 7, wherein the rotor includes:
a central opening through which an axis of rotation for the camshaft phaser passes;
the displacement assembly includes first and second fluid circuits;
for the advanced mode, the first fluid circuit is arranged to supply pressurized fluid from the central opening to the stator to displace the first wedge plate in the first axial direction; and,
for the retard mode, the second fluid circuit is arranged to supply pressurized fluid from the central opening to the stator to displace the second wedge plate in the second axial direction.

9. The camshaft phaser of claim 7, wherein the displacement assembly includes:
a first resilient element arranged to displace the first wedge ring in the first axial direction; and,
a second resilient element arranged to displace the second wedge ring in the second axial direction.

10. The camshaft phaser of claim 9, wherein:
the first resilient element is axially disposed between the first wedge ring and the stator; and,
the second resilient element is axially disposed between the second wedge ring and the stator.

11. The camshaft phaser of claim 1, wherein:
the rotor is arranged to receive a plurality of torque cycles from the camshaft;
each cycle included in the plurality of cycles includes a first torque in the first circumferential direction followed by a second torque in the second circumferential direction;
in the advance mode, for a first cycle included in the plurality of cycles:
the stator is arranged to rotate in the first circumferential direction;
the rotor is arranged to receive the first and second torques;
the rotor is arranged to rotate, with respect to the stator, a first distance in the first circumferential direction; and,
the second wedge plate is arranged to block rotation of the rotor, with respect to the stator, in the second circumferential direction; and,
in the retard mode, for a second cycle included in the plurality of cycles:
the stator is arranged to rotate in the first circumferential direction;
the rotor is arranged to receive the first and second torques;
the rotor is arranged to rotate, with respect to the stator, a second distance in the second circumferential direction; and,
the first wedge plate is arranged to block rotation of the rotor, with respect to the stator, in the first circumferential direction.

12. The camshaft phaser of claim 11, wherein:
in the advance mode, for a third cycle included in the plurality of cycles, the first resilient element is arranged to displace the first wedge plate in the second circumferential direction to block rotation of the rotor, with respect to the stator in the first circumferential direction, after the rotor has begun rotating in the first circumferential direction before the rotor has rotated the first distance in the first circumferential direction; or, in the retard mode, for a transition from a third cycle included in the plurality of cycles to a fourth cycle included in the plurality of cycles, the second resilient element is arranged to displace the second wedge plate in the first circumferential direction to block rotation of the rotor, with respect to the stator in the second circumferential direction, after the rotor has begun rotating in the second circumferential direction before the rotor has rotated the second distance in the second circumferential direction.

13. The camshaft phaser of claim 1, wherein for a drive mode in which rotation of the rotor is locked to rotation of the stator, the displacement assembly is arranged to:
displace the second wedge plate in the first axial direction to block rotation of the rotor, with respect to the stator, in the second circumferential direction; and,
displace the first wedge plate in the second axial direction to block rotation of the rotor, with respect to the stator, in the first circumferential direction.

14. A camshaft phaser, comprising:
a stator arranged to receive torque from an engine;
a rotor arranged to be non-rotatably connected to a camshaft;
first and second wedge plates radially disposed between the rotor and the stator; and,
a displacement assembly including first and second wedge rings aligned with the stator in a first axial direction, wherein:
for an advance mode:
the rotor is rotatable with respect to the stator in a first circumferential direction;
the displacement assembly is arranged to displace the second wedge ring in a first axial direction; and,
the second wedge ring is arranged to displace the second wedge plate in the first axial direction to block rotation of the rotor, with respect to the stator, in a second circumferential direction, opposite the first circumferential direction; and,
for a retard mode:
the rotor is rotatable with respect to the stator in the second circumferential direction;
the displacement assembly is arranged to displace the first wedge ring in a second axial direction; and,
the first wedge ring is arranged to displace the first wedge plate in the second axial direction to block rotation of the rotor, with respect to the stator, in the first circumferential direction.

15. The camshaft phaser of claim 14, wherein
the stator includes first and second chamfered surfaces;
the first and second wedge plates include first and second chamfered radially outer portions, respectively;
the first and second wedge rings include third and fourth chamfered surfaces, respectively;
for the advance mode, the displacement assembly is arranged to frictionally engage the second chamfered radially outer portion with the second and fourth chamfered surfaces; and,
for the retard mode, the displacement assembly is arranged to frictionally engage the first chamfered radially outer portion with the first and third chamfered surfaces.

16. The camshaft phaser of claim 14, wherein the displacement assembly includes:
a first solenoid arranged to displace the first wedge ring in the second axial direction; and,
a second solenoid arranged to displace the second wedge ring in the first axial direction.

17. The camshaft phaser of claim 16, wherein the rotor includes:
a central opening through which an axis of rotation for the camshaft phaser passes;
the displacement assembly includes first and second fluid circuits;
for the advance mode, the first fluid circuit is arranged to supply pressurized fluid from the central opening to the stator to displace the first wedge plate in the first axial direction; and,
for the retard mode, the second fluid circuit is arranged to supply pressurized fluid from the central opening to the stator to displace the second wedge plate in the second axial direction.

18. The camshaft phaser of claim 16, wherein the displacement assembly includes:
a first resilient element arranged to displace the first wedge ring in the first axial direction; and,
a second resilient element arranged to displace the second wedge ring in the second axial direction.

19. The camshaft phaser of claim 14, wherein:
the rotor is arranged to receive a plurality of torque cycles from the camshaft;
each cycle included in the plurality of cycles includes a first torque in the first circumferential direction followed by a second torque in the second circumferential direction;
in the advance mode, for a first cycle included in the plurality of cycles:
the stator is arranged to rotate in the first circumferential direction;
the rotor is arranged to receive the first and second torques;
the rotor is arranged to rotate, with respect to the stator, a first distance in the first circumferential direction; and,
the second wedge plate is arranged to block rotation of the rotor, with respect to the stator, in the second circumferential direction; and,
in the retard mode, for a second cycle included in the plurality of cycles:
the stator is arranged to rotate in the first circumferential direction;
the rotor is arranged to receive the first and second torques;
the rotor is arranged to rotate, with respect to the stator, a second distance in the second circumferential direction; and,
the first wedge plate is arranged to block rotation of the rotor, with respect to the stator, in the first circumferential direction.

20. A method of fabricating a camshaft phaser, comprising:
installing a rotor within a stator arranged to receive torque from an engine, the rotor arranged to be non-rotatably connected to a camshaft;
installing first and second wedge plates:
radially between the rotor and the stator; and,
axially sandwiching a radially outer portion of the rotor;

installing a first wedge ring radially about the rotor and axially aligned with a radially outer portion of the first wedge ring;

installing a second wedge ring:
- radially about the rotor;
- axially aligned with a radially outer portion of the second wedge ring; and,
- so that the first and second wedge rings axially sandwich the stator and the radially outer portions of the first and second wedge plates;

installing, for a displacement assembly:
- a first solenoid arranged to urge the first wedge ring toward the stator; and,
- a second solenoid arranged to urge the second wedge ring toward the stator; and, installing for the displacement assembly:
- first and second resilient elements arranged to urge the first and second wedge rings, respectively, away from the stator; or,
- first and second hydraulic circuits in the rotor and the stator arranged to receive pressurized fluid to urge the first and second wedge rings, respectively, away from the stator.

\* \* \* \* \*